(12) United States Patent
Omura et al.

(10) Patent No.: US 6,845,623 B2
(45) Date of Patent: Jan. 25, 2005

(54) COOLING SYSTEM FOR MOLDED PLASTIC FUEL TANKS

(75) Inventors: Hirokazu Omura, Saitama (JP); Satoru Tanaka, Saitama (JP); Tadayuki Morita, Saitama (JP); Yasuhiro Katsuki, Saitama (JP)

(73) Assignee: Yachiyo Kogyo Kabushiki Kaisha, Saitama-ken (JP)

( * ) Notice: Subject to any disclaimer, the term of this patent is extended or adjusted under 35 U.S.C. 154(b) by 0 days.

(21) Appl. No.: 10/341,197

(22) Filed: Jan. 13, 2003

(65) Prior Publication Data

US 2004/0134202 A1 Jul. 15, 2004

(51) Int. Cl.$^7$ .................... F25D 17/02; B29C 71/00; B29C 35/00; B29B 17/00; A01J 21/00
(52) U.S. Cl. .................. 62/64; 62/373; 62/374; 425/547; 425/404; 264/237; 264/348
(58) Field of Search .................. 62/64, 373, 374, 62/378; 425/347, 404; 264/237, 348

(56) References Cited

U.S. PATENT DOCUMENTS

| | | | | |
|---|---|---|---|---|
| 3,325,862 A | * | 6/1967 | Mehnert | 53/561 |
| 3,514,508 A | * | 5/1970 | Schott et al. | 264/85 |
| 3,829,547 A | * | 8/1974 | Milner | 264/297.5 |
| 4,039,609 A | * | 8/1977 | Thiel et al. | 264/151 |
| 4,068,155 A | * | 1/1978 | Robbins et al. | 318/568.1 |
| 5,620,715 A | * | 4/1997 | Hart et al. | 425/143 |

\* cited by examiner

Primary Examiner—William C. Doerrler
(74) Attorney, Agent, or Firm—Marshall & Melhorn, LLC

(57) ABSTRACT

In a method of cooling a tank molded from thermoplastic plastic material, a molded tank is received from a metallic die assembly at a temperature somewhat lower than a melting point of the plastic material, the molded tank is retained in a jig frame, and cooling water is sprayed onto an external surface of the molded tank. Preferably, the method further comprises the step of blowing cooling air into the tank substantially at the same time as spraying cooling liquid onto an external surface of the molded tank. Thus, the molded plastic tank can be removed from the metallic die assembly at a relatively high temperature, and the use efficiency of the metallic die assembly can be improved. Also, because the tank is not subjected to any pressure or buoyant force, it is prevented from undesirably distorting. In particular, by blowing cooling air into the tank, the tank can be cooled even more quickly.

16 Claims, 5 Drawing Sheets

COOLING SYSTEM FOR MOLDED PLASTIC FUEL TANKS

TECHNICAL FIELD

The present invention relates to a system and method for cooling a hollow molded plastic product for use as a fuel tank for vehicles and industrial applications.

BACKGROUND OF THE INVENTION

It has become increasingly common to use hollow plastic tanks made by a blow molding process as fuel tanks for motor vehicles, watercraft and other applications. In a blow molding process, molten resin material that has been obtained from an extruder is held in a die assembly defining a desired outer profile of the product and blowing air into the molten resin material so as to force the plastic material onto the surface of the die cavity.

Conventionally, the molded product is left in the die assembly for a certain period of time that is required for the molded product to become hard enough to retain its shape. If the molded product is not cooled to an adequately low temperature, it may deform during the subsequent handling. Therefore, conventionally, the product was kept in the die assembly for a significant period of time, and this prevented an efficient utilization of the die assembly.

It has been proposed to immerse the molded tank in water for cooling the same. But the force required for keeping the tank immersed against the buoyant force is so great that it could deform the tank. It has also been proposed to introduce cooling water into the tank. But it was found that removing water out of the tank is time-consuming and not easy to accomplish.

BRIEF SUMMARY OF THE INVENTION

In view of such problems of the prior art, a primary object of the present invention is to provide an improved method of cooling molded plastic fuel tank in a highly efficient manner.

A second object of the present invention is to provide an improved method of cooling molded plastic fuel tank which would not cause deformation of the molded fuel tank.

A third object of the present invention is to provide an improved method of cooling molded plastic fuel tank which can rapidly cool the fuel tank and release it for the subsequent process without any significant time delay.

A fourth object of the present invention is to provide a plastic fuel tank cooling system which is suitable for implementing such a method.

According to the present invention, such objects can be accomplished by providing a method of cooling a tank molded from thermoplastic plastic material, comprising the steps of: receiving a molded tank at a temperature somewhat lower than a melting point of the plastic material; retaining the molded tank in a jig frame; and spraying cooling liquid such as water onto an external surface of the molded tank. Preferably, the method further comprises the step of blowing cooling air into the tank substantially at the same time as spraying cooling liquid onto an external surface of the molded tank.

Thus, the molded plastic tank can be removed from the metallic die assembly at a relatively high temperature, and the use efficiency of the metallic die assembly can be improved. Also, because the tank is not subjected to any pressure or buoyant force, it is prevented from undesirably distorting. In particular, by blowing cooling air into the tank, the tank can be cooled even more quickly.

A fuel tank is typically required to be provided with a relatively high positional precision at a few selected locations. Therefore, it is preferable for the jig frame to be provided with members for retaining such locations at a desired precision. The cooling liquid which may remain on the surface of the tank after the completion of the cooling process may be removed by blowing high pressure air.

The tank which has been taken out of the metallic die assembly is relatively warm, and tends to shrink as it cools off. Therefore, it is preferable for the cooling air supplying unit for blowing cooling air into the tank to be able to accommodate the shrinking of the tank by using a moveable support such as a slide bearing or pivotal support. For an air tight connection of the cooling air supplying unit with a hole of the tank, the cooling air supplying unit may be provided with a suitable sealing arrangement.

Such a method can be conveniently implemented by using a system for cooling a tank molded from thermoplastic plastic material, comprising: a jig frame for retaining a molded tank; and a cooling liquid spraying unit for spraying cooling liquid onto an external surface of the molded tank.

For the convenience of charging a tank into the cooling system, the jig frame preferably comprises a lower jig frame structure and an upper jig frame structure that can be selectively opened with respect to the lower jig frame structure. In particular, the lower jig frame structure may be provided with an open top for the convenience of charging and removing a tank into and from the jig frame, and the upper jig frame structure mat be adapted to be attached to and detached from the lower jig frame structure by using a suitable clamping arrangement.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
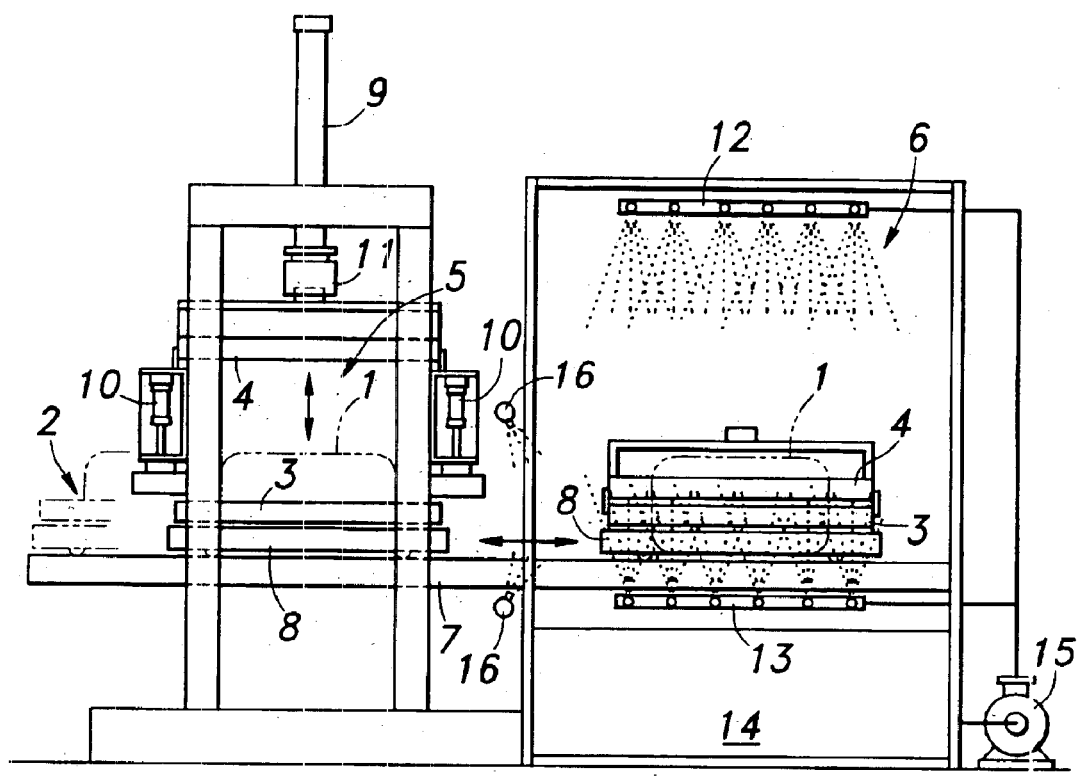
FIG. 1 is an overall schematic view of a cooling system embodying the present invention.

FIG. 1 shows an overall view of a cooling system for plastic fuel tanks embodying the present invention. This cooling system comprises a load/unload station 2 for charging and removing a plastic tank 1 forwarded from a metallic die assembly (not shown in the drawing), a jig open/close station 5 for retaining and releasing the tank 1 in and out of a jig frame including an upper jig frame 3 and lower jig frame 4, and a cooling station 6 for cooling the tank 1 while it is held between the upper and lower jig frames 3 and 4. The tank 1, once it is held between the upper and lower jig frames 3 and 4, is conveyed by a carriage 8 traveling over a rail 7 extending between the load/unload station 2 and cooling station 6 and driven by a link chain or the like not shown in the drawing.

The jig open/close station 5 comprises a lifting unit 9 for vertically moving the upper jig frame 4, which is adapted to retain the tank 1 in cooperation with the lower jig frame 3, by using an air cylinder, and a pair of clamp/unclamp units 10 for actuating clamp mechanisms (which will be described hereinafter) for joining the lower jig frame 3 with the upper jig frame 4 by using air cylinders. The lower end of the lifting unit 9 is provided with a gripping unit 11 for gripping the upper jig frame 4 by using an air cylinder.

The cooling station 6 comprises upper shower nozzles 12 for spraying cooling water downward from above, lower shower nozzles 13 for spraying cooling water upward from beneath the rail 7, a cooling water tank 14 for receiving and storing cooling water that has been sprayed from the shower nozzles 12 and 13, and a circulating pump 15 for feeding the cooling water from the cooling water tank 14 to the shower nozzles 12 and 13 under pressure. The cooling station 6 preferable consists of a shower booth which is surrounded by a wall to prevent splashing of the water out of the station. Because the cooling water receives heat from the tank 1 and its temperature rises in time, it is preferable to cool the cooling water by using a suitable heat exchanger.

Between the jig open/close station 5 and cooling station 6 is provided a water removing unit 16 including air nozzles for blowing away moisture from the tank 1 that is held between the upper and lower jig frames 3 and 4.

Figure 2:
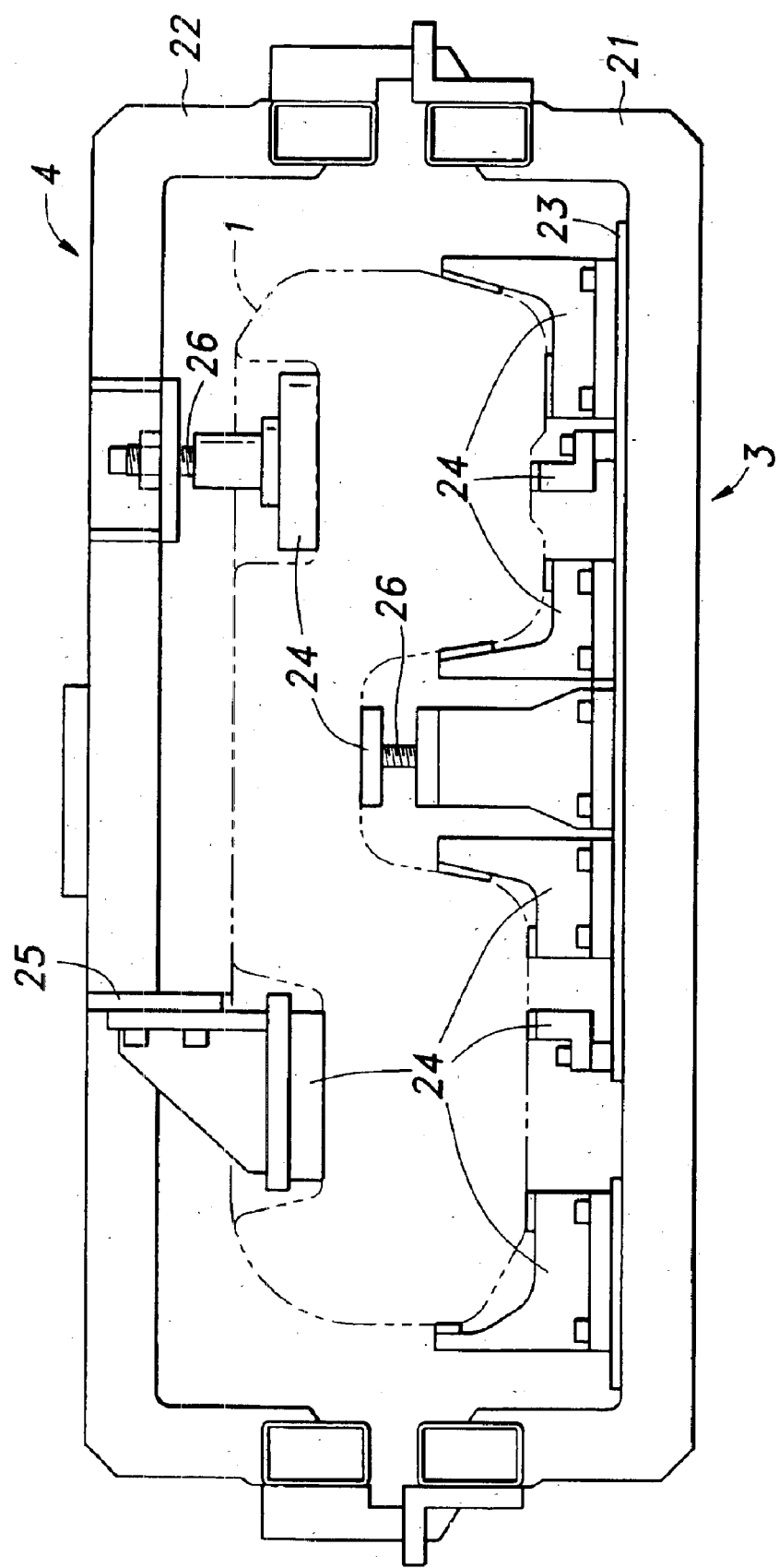
FIG. 2 is a simplified front view of the jig frame.

Referring to FIG. 2, the upper and lower jig frames 3 and 4 are each provided with a frame structure 21 and 22 made of light-weight steel shape metal or extruded aluminum and a plurality of shape retaining members 24 that abut appropriate parts of the tank 1. The lower jig frame 3 is additionally provided with a base 23 made of steel or aluminum plate for supporting various components. The shape retaining members 24 are each adapted to be adjusted of its position by mounting it, via a slot or the like, onto a bracket 25 secured to the frame structure 21 and 23, changing shims that are interposed between the shape retaining members 24 and base 23, or by using a position adjusting unit 26 incorporated with a screw jack or air cylinder. Particularly in the case of the automotive fuel tank, certain parts of the tank such as the mounting surfaces for mounting the tank onto the vehicle body and attaching other auxiliary components such as a fuel pump and a vent valve onto the tank are required to be provided with a relatively high positional precision so that the shape retaining members 24 should be selectively arranged in such parts by taking into account the shrinkage of the tank that occurs during the cooling process.

The upper jig frame 4 is provided with a cooling air supplying unit 31 for supplying cooling air into the tank 1 and a cooling air vent unit 41 fore releasing the cooling air from the tank 1 although not shown in FIG. 2.

Figure 3:
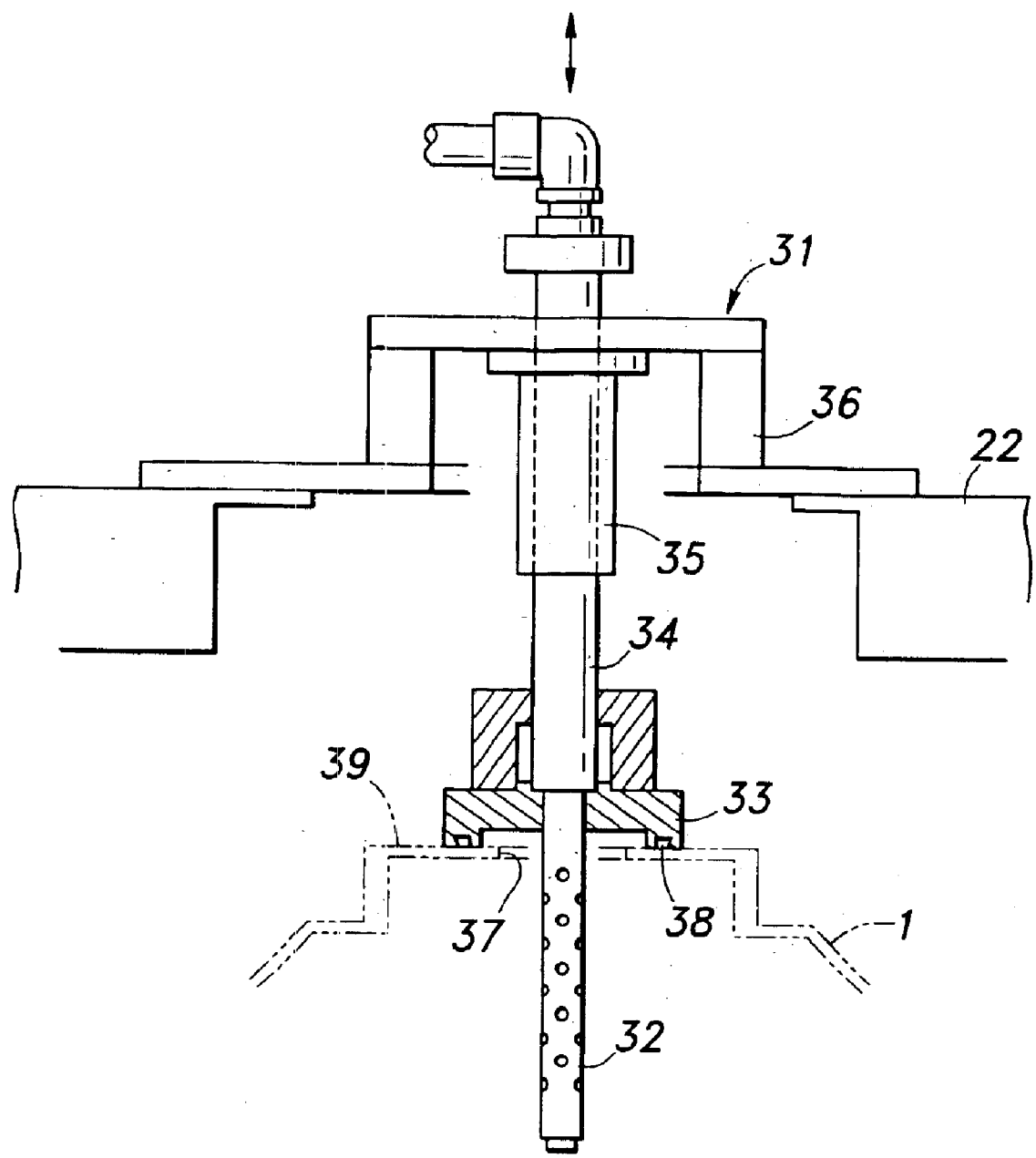
FIG. 3 is a simplified front view of the cooling air supply unit.

Referring to FIG. 3, the cooling air supplying unit 31 comprises a linear air feed tube 34 provided with an air nozzle unit 32 in a free end (or lower end) thereof, a tank engaging member 33 integrally connected to an intermediate part of the air feed tube 34, and a slide bearing 35 slidably supporting the base end (or upper end) of the feed tube 34. The fixed part of the slide bearing 35 is attached to a part of the frame structure 22 of the upper jig frame 4 via a bracket 36 so that the tank engaging member 33 along with the air feed tube 34 can move vertically by a certain stroke relative to the upper jig frame 4. The air nozzle unit 32 is adapted to be introduced into the tank 1 from a hole 37 provided in an upper central part of the fuel tank for mounting a fuel pump (not shown in the drawing), and comprises a plurality of orifices that are oriented in various directions so as to direct the cooling air in various directions within the tank 1.

The tank engaging member 33 is provided with an annular surface which is adapted to engage a substantially horizontal surface 39 surrounding the hole 37 via a resilient seal member 38 such as an O-ring. The horizontal surface 39 provides a mounting surface for the fuel pump. The assembly including the air nozzle unit 32, tank engaging member 33 and air feed tube 34 is thus allowed to move linearly, and the weight of the assembly is selected so that a required sealing can be ensured for the cooling air without deforming the horizontal surface 39 of the tank 1. The tank engaging member 33 can therefore follow the changes in the position of the horizontal surface 39, that may occur due to the shrinking during the cooling process, under the weight of the assembly, and is thereby kept in close contact with the horizontal surface 39 so as to prevent the leakage of the cooling air that is conducted into the tank 1 via the air nozzle unit 32.

Figure 4:
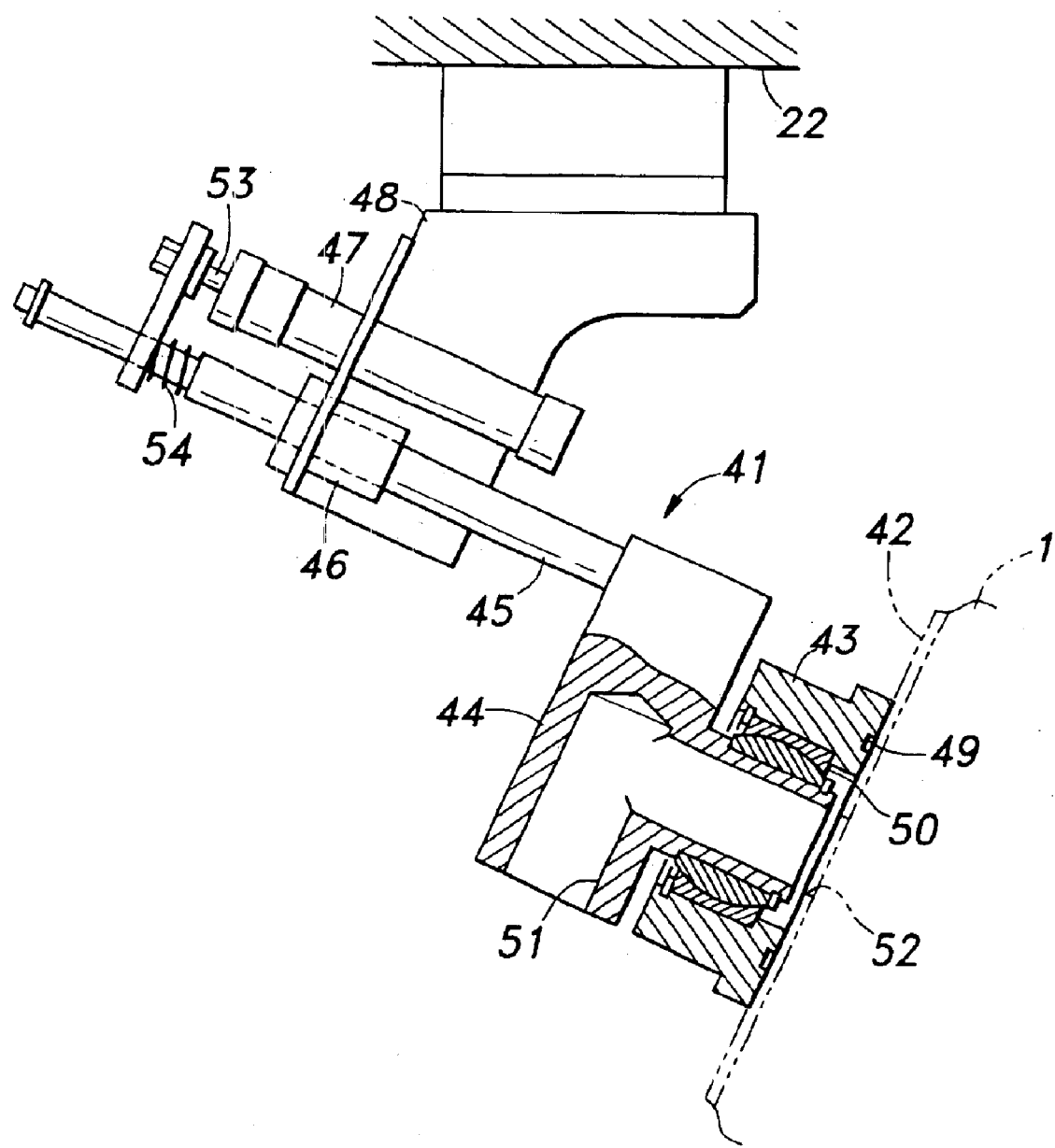
FIG. 4 is a simplified front view of the cooling air vent unit.

Referring to FIG. 4, the cooling air vent unit 41 comprises a tank engaging member 43 adapted to engage an inclined surface 42 formed in the tank 1 to provide a mounting surface for a filler pipe (not shown in the drawings), a vent passage member 44 connected to the tank engaging member 43 via a spherical joint 50, a slide rod 45 having a free end fixedly attached to the vent passage member 44, a slide bearing 46 slidably supporting the slide rod 45 relative to a bracket 48 which is fixedly secured to the frame structure 22, and an actuator 47 typically consisting of an air cylinder for linearly actuating the slide rod 45 along the slide bearing 46. The actuator 47 along with the fixed part of the slide bearing 46 is attached to the bracket 48. Thus, the tank engaging member 43 along with the vent passage member 44 attached integrally thereto can move along an oblique axial line toward and away from the inclined surface 42 of the tank 1 by a prescribed stroke.

The tank engaging member 43 is provided with an annular surface fitted with a resilient seal member 49 such as an O-ring which is adapted to engage the inclined surface 42 of the tank 1 in an air tight manner. The vent passage member 44 is connected to the tank engaging member 43 via the spherical joint 50 to accommodate a pivotal movement of the tank engaging member 43. The vent passage member 44 is internally provided with a vent passage 51 that has an internal end having a substantially same diameter as a hole 52 provided in the inclined surface 42 and communicating with this hole 52, and an external end fitted with an elbow or the like to avoid intrusion of cooling water into the tank 1 as will be described hereinafter.

A compression coil spring 54 is interposed between the piston rod 53 of the actuator 47 and an annular shoulder of the slide rod 45, and the spring force of this coil spring 54 is selected in such a manner that a required sealing performance can be achieved without deforming the inclined surface 42 of the tank 1. Thus, the tank engaging member 43 is pressed against the inclined surface 42 of the tank 1 by the thrust force of the actuator 47 while compressing this compression coil spring 54 so that the tank engaging member 43 can follow the displacement of the inclined surface 42 due to the shrinking of the tank 1 that may occur during the cooling process and is kept in close contact with the inclined surface 42. Therefore, the cooling water that is sprayed onto the tank 1 is prevented from getting into the tank 1.

A clamp mechanism 61 is provided in each of the front and rear parts of the upper and lower jig frames 3 and 4.

Figure 5:
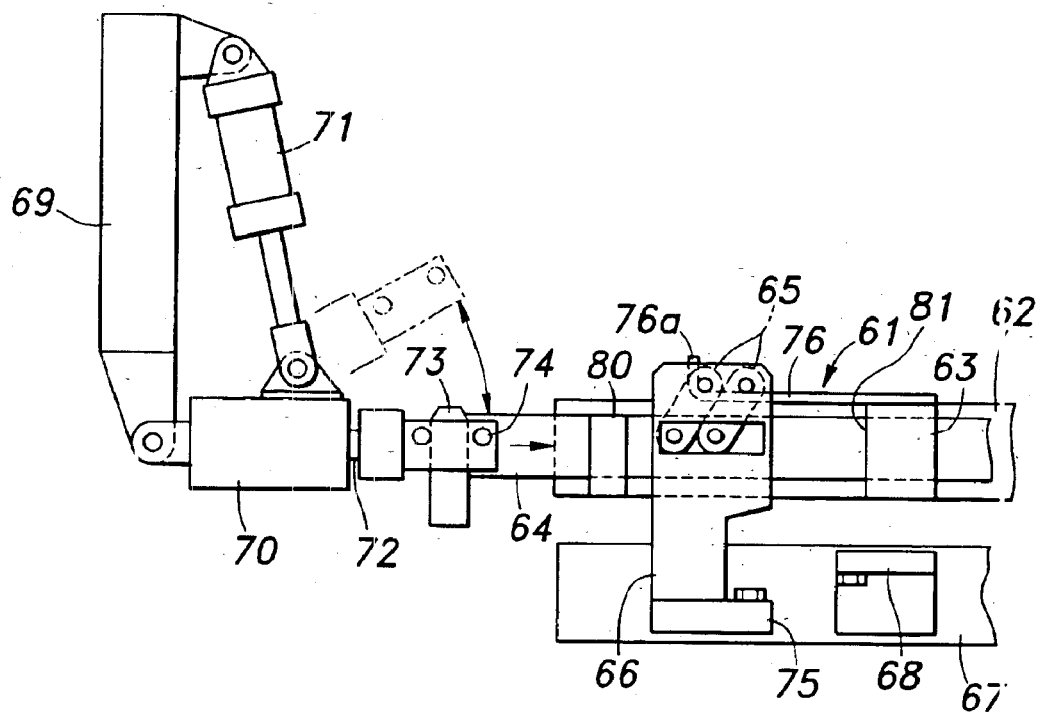
FIG. 5 is a fragmentary view of the clamp/unclamp unit partly in section showing the clamp mechanism in the unclamped sate.

Each of the clamp mechanisms 61 comprises a slide plate 64 laterally slidably supported by a slide support member 63 which is fixedly attached to a part of a lateral member 62 forming a part of the frame structure 22 of the upper jig frame 4, a pair of moveable clamp members 66 (only one of them is shown in FIG. 5) attached to either lateral end of the slide plate 64 each via a pair of parallel links 65 each having a lower end pivotally attached to the slide plate 64, and a pair of fixed clamp members 68 fixed attached to either lateral end of a lateral member 67 forming a part of the frame structure 21 of the lower jig frame 3 so as to be selectably engaged by the corresponding moveable clamp members 66. The upper ends of each pair of parallel links 65 are slidably guided by a guide member 76 fixedly attached to the lateral member 62 and extending in parallel with the lateral member 62.

The clamp/unclamp mechanism 10 for actuating each of these clamp mechanisms 61 comprises a slide plate drive actuator 70 consisting of an air cylinder having an end pivotally attached to a fixed bracket 69 for driving the slide plate 64, and a shift actuator 71 likewise consisting of an air cylinder for pivotally actuating the free end of the drive actuator 70 so as to cause a substantially vertical shifting movement of the free end of the drive actuator 70. The free end of the piston rod 72 of the slide plate drive actuator 70 is provided with a claw 74 for selectively engaging a striker 73 provided at an end of the slide plate 64. The two clamp/unclamp mechanisms 10 are provided in diagonally opposing two of the four columns provided in the four corners of the jig frame open/close station 5, and the two slide plates provided in the front and rear faces of the upper jig frame 4 are adapted to be actuated in mutually opposite directions.

The mode of operation of the cooling system for cooling plastic fuel tanks according to the present invention is described in the following.

Figure of all, the tank 1 which has been taken out of the metallic die assembly (not shown in the drawing) and is still warm is placed on the lower jig frame 3 which is secured to the carriage 8 and located in the load/unload station 2, and is transported by the carriage 8 to the jig frame open/close station 5. As the load/unload station 2 is located before the jig frame open/close station 5, and has an open top, the charging and removing the tank 1 into and out of the lower jig frame 3 can be carried out without any difficulty.

When the carriage 8 which has traveled from the load/unload station 2 has reached and come to a stop at a prescribed position in the jig frame open/close station 5, the upper jig frame 4 which has been retained by the gripping unit 11 provided in the lower end of the lifting unit 9 is lowered onto the tank 1 placed on the lower jig frame 3. At this time, the clamp mechanisms 61 of the upper and lower jig frames 3 and 4 are still in the unclamped state, and the slide plate drive actuators 70 of the clamp/unclamp units 10 are still in the upwardly shifted position that does not interfere with the clamp mechanisms 61. In the following description, only one of the clamp mechanisms 61 is described as they are identical in both structure and operation.

Figure 6:
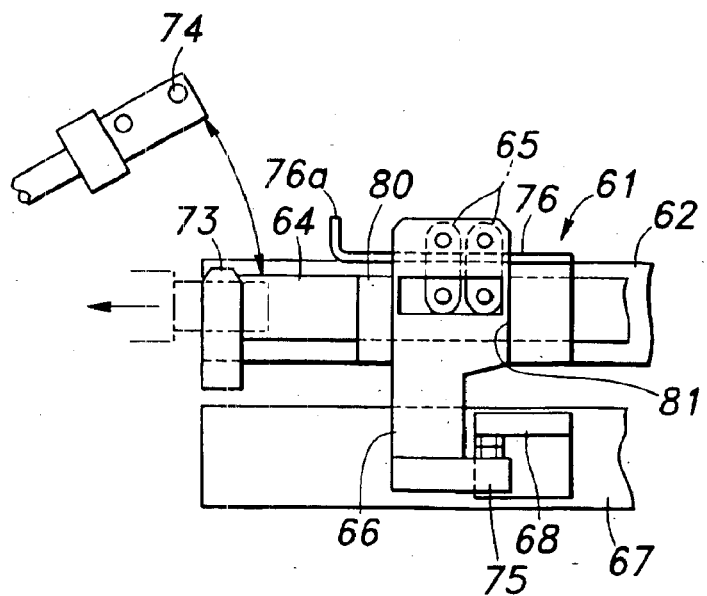
FIG. 6 is a view similar to FIG. 5 showing the clamp mechanism in the clamped sate.

Then, the shift actuator 71 is extended while the slide plate drive actuator 70 is still in the retracted state to shift the slide plate drive actuator 70 downward until the claw 74 at the free end thereof engages the striker 73 at the corresponding end of the slide plate 64 in the unclamped state (see FIG. 5). As the slide plate drive actuator 70 is extended from this state, the slide plate 64 moves rightward until the moveable clamp member 66 engages a stopper surface 81 of the slide support member 63. As a result, a lateral projection 75 provided in the lower end of the moveable clamp member 66 is allowed to move into a location immediately under the fixed clamp member 68 fixedly attached to the lower jig frame 4. As the slide plate 64 is pushed laterally even further, the lower ends of the parallel links 65 are moved rightward while the moveable clamp member 66 along with the upper ends of the parallel links 65 are prevented from moving rightward any further. This causes the parallel links 65 to rise into upright positions. The terminal position of the slide plate 64 is defined by a lateral projection 80 of the slide plate 64 abutting the moveable clamp member 66. The rising of the parallel links 65 causes the moveable clamp member 66 to be lifted upward, and the lateral projection 75 to engage the fixed clamp member 68 (FIG. 6). The lower and upper jig frames 3 and 4 are thus joined to each other.

Thereafter, the shift actuator 71 is retracted while the slide plate drive actuator 70 is kept extended so as to upwardly shift the slide plate drive actuator 70 and release the claw 74 from the striker 73 at the end of the slide plate 64. At the same time, the gripping unit 11 at the lower end of the lifting unit 9 is removed from the upper jig frame 4, and only the gripping unit 11 is moved upward to a position that does not interfere with the upper jig frame 4.

Concurrently with this clamping process, the cooling air supplying unit 31 and cooling air vent unit 41 are brought into contact with the corresponding parts of the tank 1.

Cooling air is then supplied into the tank to cool the tank 1 and to maintain the internal pressure of the tank 1 slightly higher than the atmospheric pressure so that the contact between the shape retaining members 24 of the upper and lower jig frames 3 and 4 and the tank 1 may be ensured. The internal pressure of the tank 1 can be selected as required by adjusting the flow rate of the admitted cooling air and the resistance at the cooling air vent unit 41. The sealing of the contact surfaces of the cooling air supplying unit 31 and cooling air vent unit 41 is ensured at all times irrespective of the deformation of the tank 1 owing to the moveable supports for the cooling air supplying unit 31 and cooling air vent unit 41 and the provision of the seal members 38 and 49. The tank 1 along with the upper and lower jig frames 3 and 4 is then transported to the cooling station 6.

When the tank 1 carried by the carriage 8 has advanced into the cooling station 6 from the jig frame open/close station 5, cooling water is sprayed from the upper and lower shower nozzles 12 and 13 onto the outer surface of the tank 1 for a prescribed period of time. The timing of this water spraying process may be synchronized with the movement of the carriage 8. To avoid an excessive splashing of the cooling water that may occur depending on the shape of the tank 1 and jig frames 3 and 4, the spraying of the cooling water from the shower nozzles 12 and 13 may be started only after the carriage 8 has come to a stop in the cooling booth and a water shut-off door has been closed.

Because the tank 1 is cooled by the cooling water that is sprayed onto the outer surface of the tank 1 as opposed to the conventional arrangement where the tank is immersed in water, the tank is not subjected to any buoyant force or water pressure, and is thereby protected from any undesired distortions. By controlling the number and positions of the upper and lower shower nozzles 12 and 13 and/or the flow rate of the cooling water, the tank 1 can be cooled uniformly and at a controlled rate depending on the shape and wall-thickness of the particular tank 1. Also, at the same time as cooling the tank from outside with the cooling water, the tank 1 is cooled from inside by the fresh cooling air that is introduced into the tank. This allows the tank 1 to be cooled both rapidly and evenly. An uneven cooling of the tank could cause undesired residual stress and/or distortion. Also, rapid cooling is beneficial in improving the production efficiency.

When the tank 1 has cooled to a prescribed degree, the carriage 8 is returned to the jig frame open/close station 5. During this process, high pressure air from a water removing unit 16 provided around the exit of the cooling station 6 and rail 7 is impinged upon the tank 1, and expels the water from the surface of the tank 1 and upper and lower jig frames 3 and 4.

When the carriage 8 has returned from the cooling station 6 and come to a stop in the jig frame open/close station 5, the high pressure air is shut off and the clamp mechanisms 61 of the upper and lower jig frames 3 and 4 are unclamped by reversing the clamping process described above. The lifting unit 9 is lowered to grip the upper jig frame 4 with the gripping unit 11 and raise it. To ensure the unclamping process to be carried out in a reliable manner, as the slide plate 64 moves leftward, a hooked portion 76a of the guide member 76 fixedly secured to the slide support member 63 engages the upper end of the parallel links 65 to retain them in a collapsed state at the end of the leftward stroke of the slide plate 64.

After the upper and lower jig frames 3 and 4 have bee thus separated from each other, the carriage 8 is returned to the load/unload station 2, the tank 1 is removed from the lower jig frame 4, and it is replaced by a next tank 1 to repeat the entire process described above. If desired, high pressure air may be manually impinged upon the tank before or after removing it from the lower jig frame 4 by using a hand-held nozzle or the like to more thoroughly remove moisture from the surface of the tank 1.

Although the present invention has been described in terms of a preferred embodiment thereof, it is obvious to a person skilled in the art that various alterations and modifications are possible without departing from the scope of the present invention which is set forth in the appended claims.

What is claimed is:

1. A method of cooling a tank molded from thermoplastic plastic material, comprising the steps of:
    receiving a molded tank at a temperature somewhat lower than a melting point of the plastic material;
    spraying cooling liquid onto an external surface of said molded tank;
    blowing cooling air into said tank so as to maintain an internal pressure of said tank higher than a surrounding pressure substantially at the same time as spraying cooling liquid onto an external surface of said molded tank; and
    removing said cooling liquid from a surface of said molded tank by blowing high pressure air onto the surface of said molded tank.

2. A method of cooling a tank molded from thermoplastic plastic material, comprising the steps of:
    receiving a molded tank at a temperature somewhat lower than a melting point of the plastic material;
    retaining said molded tank in a jig frame; and
    spraying cooling liquid onto an external surface of said molded tank;
    wherein said molded tank is provided with at least two holes, and said jig frame comprises a cooling air supplying unit and cooling air vent unit for blowing cooling air into said tank from one of said holes and releasing said cooling air from the other of said holes while preventing said cooling liquid from getting into said molded tank.

3. A system for cooling a tank molded from thermoplastic plastic material, comprising:
    a jig frame for retaining a molded tank;
    a cooling liquid spraying unit for spraying cooling liquid onto an external surface of said molded tank;
    a cooling air supplying unit for blowing cooling air into said tank from a first hole provided in said tank, said cooling air supplying unit being provided with a moveable support and a seal member for allowing an air outlet of said cooling air supplying unit to be connected to said first hole substantially in an air-tight manner while accommodating a distortion of said tank; and
    a cooling air vent unit for releasing said cooling air from a second hole provided in said tank, said cooling air vent unit being provided with a moveable support and a seal member for allowing an air inlet of said cooling air vent unit to be connected to said second hole substantially in an air-tight manner while accommodating a distortion of said tank.

4. A system according to claim 3, wherein said jig frame is adapted to retain a plurality of selected parts of said molded tank each at a prescribed position.

5. A system according to claim 3, further comprising a liquid removing unit for blowing high pressure air onto the outer surface of said tank.

6. A system according to claim 3, wherein said jig frame comprises a lower jig frame structure and an upper jig frame structure that can be selectively opened with respect to said lower jig frame structure.

7. A system according to claim 6, wherein said lower jig frame structure is provided with an open top, and said upper jig frame structure is adapted to be attached to and detached from said lower jig frame structure.

8. A system according to claim 1, wherein further comprising the step of retaining said molded tank in a jig frame immediately after receiving said molded tank.

9. A method according to claim 2, further comprising the step of removing said cooling liquid from a surface of said molded tank by blowing high pressure air onto the surface of said molded tank.

10. A system for cooling a tank molded from thermoplastic plastic material comprising:
    a jig frame for retaining a molded tank;
    a cooling liquid spraying unit for spraying cooling liquid onto an external surface of said molded tank;
    a cooling air supplying unit for blowing cooling air into said tank from a first hole provided in said tank so as to maintain an internal pressure of said tank higher than a surrounding pressure; and
    a cooling air vent unit for releasing said cooling air from a second hole provided in said tank.

11. A method according to claim 8, wherein said jig frame retains a plurality of selected parts of said molded tank each at a prescribed position.

12. A system for cooling a tank molded from thermoplastic material, comprising:
    a jig frame for retaining a molded tank;
    a cooling liquid spraying unit for spraying cooling liquid onto an external surface of said molded tank;

a cooling air supplying unit for blowing cooling air into said tank from a first hole provided in said tank so as to maintain an internal pressure of said tank higher than a surrounding pressure;

wherein said cooling air supplying unit is provided with a moveable support and a seal member for allowing an air outlet of said cooling air supplying unit to be connected to said first hole substantially in an air-tight manner while accommodating a distortion of said tank; and said cooling air vent unit is provided with a moveable support and a seal member for allowing an air inlet of said cooling air vent unit to be connected to said second hole substantially in an airtight manner while accommodating a distortion of said tank.

13. A system according to claim 10, wherein said jig frame is adapted to retain a plurality of selected parts of said molded tank each at a prescribed position.

14. A system for cooling a tank molded from thermoplastic material, comprising:

a jig frame for retaining a molded tank;

a cooling liquid spraying unit for spraying cooling liquid onto an external surface of said molded tank;

a cooling air supplying unit for blowing cooling air into said tank from a first hole provided in said tank so as to maintain an internal pressure of said tank higher than a surrounding pressure; and a liquid removing unit for blowing high pressure air onto the outer surface of said tank.

15. A system according to claim 10, wherein said jig frame comprises a lower jig frame structure and an upper jig frame structure that can be selectively opened with respect to said lower jig frame structure.

16. A system according to claim 15, wherein said lower jig frame structure is provided with an open top, and said upper jig frame structure is adapted to be attached to and detached from said lower jig frame structure.

* * * * *